(No Model.) 4 Sheets—Sheet 1.
G. P. JOHNSON.
MACHINE FOR SHREDDING WOOD.
No. 511,778. Patented Jan. 2, 1894.
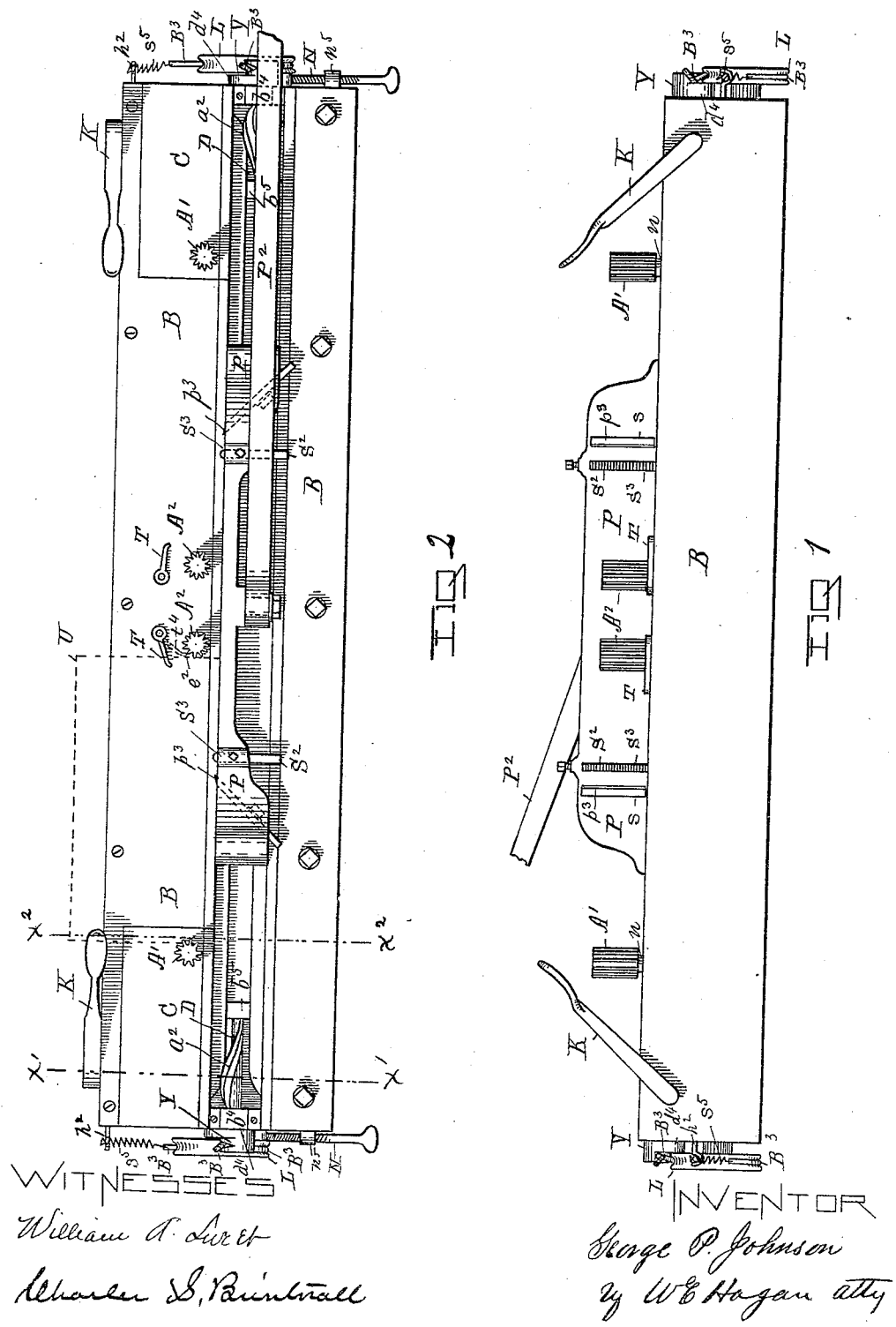

(No Model.) 4 Sheets—Sheet 2.

G. P. JOHNSON.
MACHINE FOR SHREDDING WOOD.

No. 511,778. Patented Jan. 2, 1894.

WITNESSES
William A. Livet
Charles S. Brintnall

INVENTOR
George P. Johnson
by W. E. Hagan atty (No Model.) 4 Sheets—Sheet 3.
G. P. JOHNSON.
MACHINE FOR SHREDDING WOOD.
No. 511,778. Patented Jan. 2, 1894.
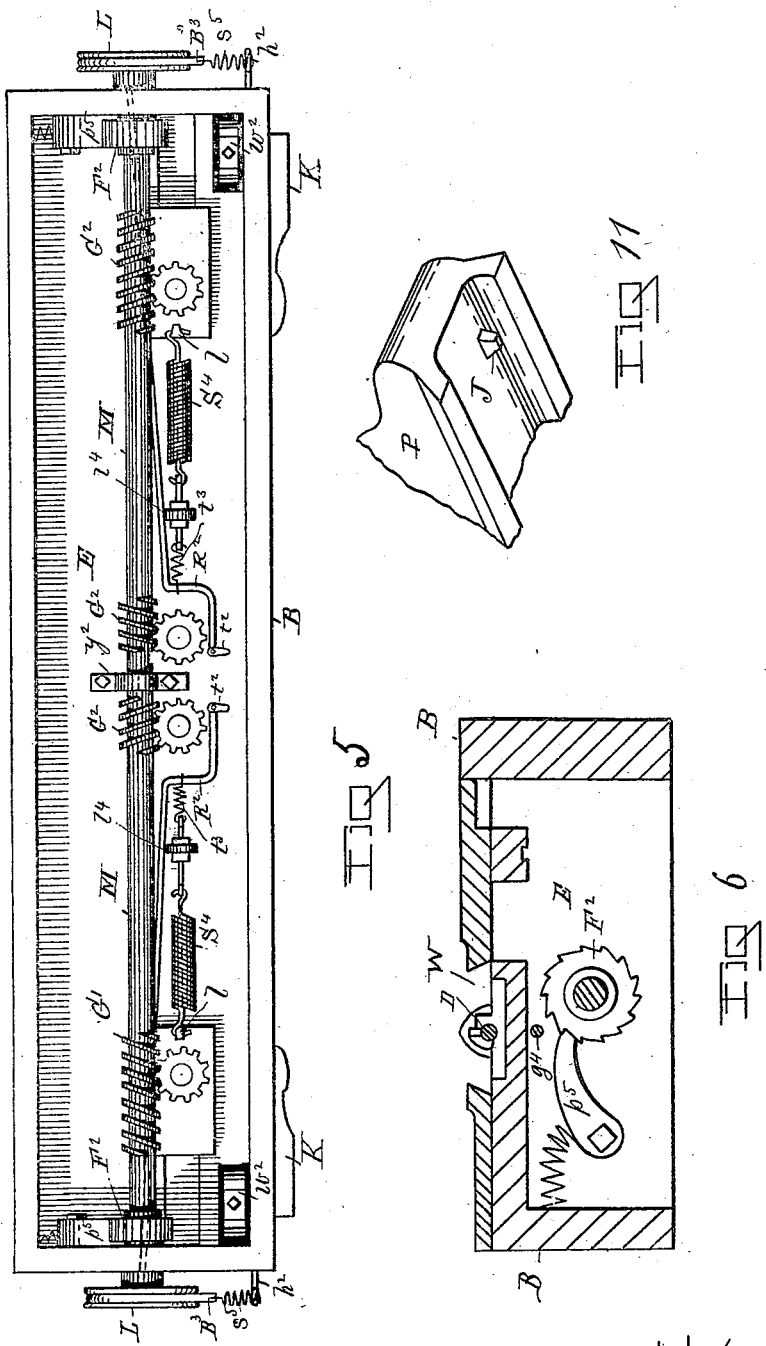
WITNESSES
Charles S. Burtnall
William A. Livet
INVENTOR
George P. Johnson
by W. E. Hagan atty

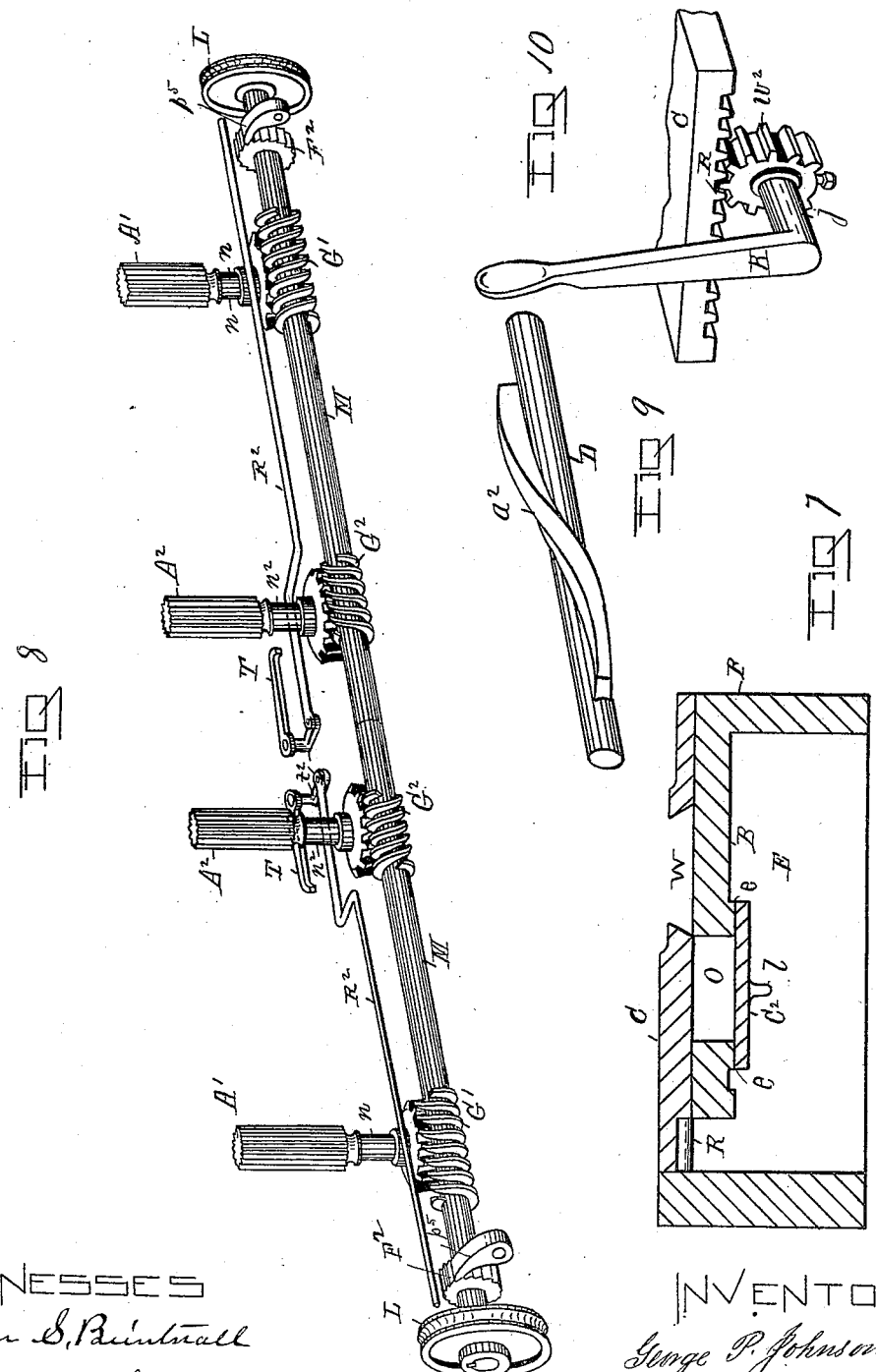

UNITED STATES PATENT OFFICE.

GEORGE P. JOHNSON, OF GLOVERSVILLE, NEW YORK, ASSIGNOR OF TWO-THIRDS TO PETER C. McNEIL AND WILLIAM J. WILSON, OF SAME PLACE.

MACHINE FOR SHREDDING WOOD.

SPECIFICATION forming part of Letters Patent No. 511,778, dated January 2, 1894.

Application filed October 31, 1892. Serial No. 450,434. (No model.)

*To all whom it may concern:*

Be it known that I, GEORGE P. JOHNSON, of the city of Gloversville, Fulton county, State of New York, have invented new and useful Improvements in Machines for Shredding Wood, of which the following is a specification.

My invention relates to improvements upon that class of machines which are used for shredding wood, and producing what is known to the trade as "excelsior" a product that is employed for filling mattresses, packing furniture, and other articles; and the object of my improvements upon this class of machines is to improve the product, and to increase the production relatively to the amount of power employed, and to generally better adapt this class of machines to the uses for which they are designed.

Accompanying this specification to form a part of it there are four plates of drawings containing eleven figures illustrating my invention with the same designation of parts by letter reference used in all of them.

Figure 4:
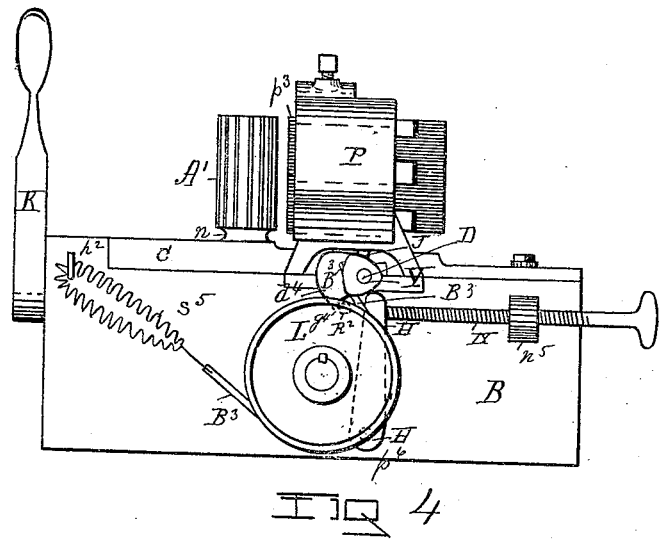
Figure 5:
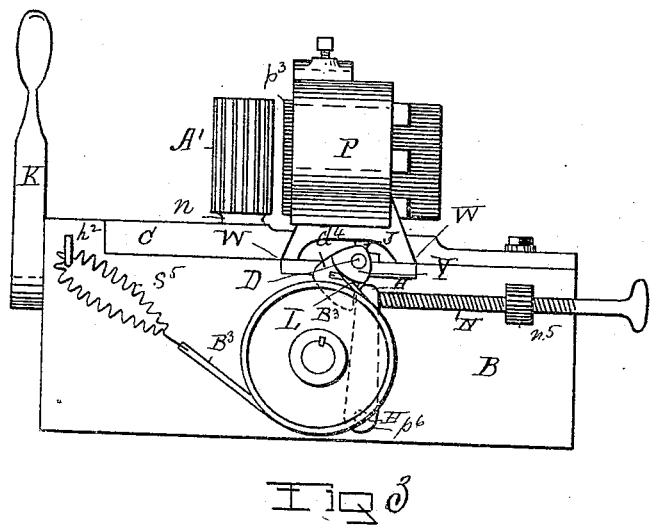

Of the illustrations Figure 1, is a side elevation of a machine containing my invention with that side of the apparatus wherein the wood is introduced for shredding shown as facing the view. Fig. 2, is a top view of the machine. Fig. 3, is an end view with the carrier having therein the spurs and planes shown as having at that end of the machine operated the feed mechanism after the plane and spurs upon that end of the carrier had passed the end of the block thereat. Fig. 4, is a view of the same end of the machine but illustrated with the feeding mechanism not operated upon by the carrier. Fig. 5, is a bottom view of the machine, with what is its under side when in use shown as uppermost. Fig. 6, is a section taken on the line $x'$, $x'$, of Fig. 2. Fig. 7, is a section taken on the line $x^2$, $x^2$, of Fig. 2. Fig. 8, is a perspective of the feed-shaft, and its connections shown as separated from the rest of the apparatus. Fig. 9, is a perspective of a shaft having thereon a spiral cam that by engagement with a lug on the bottom of the plane and spur carrier operates the feed shaft; there being one of these spiral cam-shafts at each end of the machine. Fig. 10, is a perspective of one of the clutch-plates, the rack on the bottom of the latter, and the spur-wheel and crank by which it is operated; there being one of these clutch-plates at each end of the machine. Fig. 11, is a perspective of one end of the plane and slitting spurs carrier, with what is its under side when in use facing the view; both ends of said carrier being made alike and each having a downwardly projected lug which engages with the spiral cam thereat to operate the feed-mechanism.

The several parts of the apparatus thus illustrated are designated by letter reference, and the function of the parts is described as follows:

The letter B, designates a bed within and upon which the apparatus is located. This bed has a box-form with a flat horizontal top, with vertical sides and ends that form an inclosure E. This bed is made with a slide-way W, in its upper face; said slide-way having downwardly and outwardly beveled sides into which the bottom of the carrier is made to tongue.

The letter P, designates a plane and spur carrier that is operated by a pitman $P^2$, to be reciprocatingly moved in said slide-way.

The letters $p^3$, $p^3$, designate plane-blades of which there is one located at each end of the machine. Each of these plane-blades has its blade edge vertically arranged in a slot $s$, made in said carrier-bar, so as to cut from the side of a block placed to face the vertical side of the carrier in which the planes are located.

The letters $S^2$, designate spurs or slitting blades that are arranged in a slot $S^3$, at each end of the carrier. These spurs are placed adjacent to the plane-blades with their edges cutting lengthwise of the wood and in the line of the carrier movement; and they are each arranged on the inner side of one of the plane-blades to slit in advance of the shaving done by the plane-blades.

The letters C, designate chuck-plates of which there is one at each end of the machine upon the feed-side of the latter. Each of these chuck-plates is let into the top of the bed B, so as to form where extended inwardly from the end one side of the carrier slide-way W, as shown at Fig. 7. The letter $C^2$, designates a plate connected to the bottom of each of the chuck-plates which straddles the opening O, to bear on the under side of the bed B, and thereat slide when the chuck plates are moved outwardly endwise, the chuck-plates being each kept in place by the upcast edge of the bed B, as indicated at $e$, of Fig. 7, and the bottom plates $C^2$.

The letter R, designates a rack formed on the under side of each of the chuck-plates at its outer edge as shown at Figs. 7 and 10, and the letters $w^2$, designate a spur-wheel adapted to mesh into the rack on the bottom of each of the chuck-plates as shown at Fig. 10. Each of these spur-wheels is provided with a shaft $j$, made to journal in the sides of the bed, and where subtending the latter is provided with an operating crank K.

The letter $l$ designates a lug that is downwardly projected from the under side of the plate $C^2$, and $S^4$, a spiral spring one end of which is connected to said lug, and the other end to the rod $R^2$, so that each of said chuck-plates C, are drawn out against the force of said spring and as shown at Fig. 5.

The feeding mechanism consists of two parts both of which are constructed alike, and each is adapted to receive, grasp, and move up a separate block of wood to be operated upon alternatingly by the slitting spurs, and plane at each end of the carrier. These feeding mechanisms each consist of a vertically fluted roller that is mounted vertically on each of the chuck-plates so as to move with them, and a feed roller that is vertically fluted, and vertically mounted in the machine bed. The chuck-plate rollers are designated at A', and they are each made with a shaft $n$, that is downwardly projected through the top of the bed, and is made to journal therein, and where extending below the top of the bed each of these chuck-plate rollers is provided with a spur-wheel adapted to mesh into a worm gear G' on that part of the two-part shaft M, which is immediately beneath it. The bed feed roller of each feed mechanism is designated at $A^2$, and each of them is vertically fluted and vertically mounted in the top of the bed and having shafts $n^2$, extending down through the latter, and which shafts are each provided with a spur-wheel adapted to engage with a worm-gear $G^2$ on that part of the two-part shaft which is immediately beneath it, each feeding mechanism consisting of a chuck-plate, a chuck-plate roller, a feed roller and one part of the two part shaft M. This shaft M, is divided in two parts each of which is the counterpart of the other and each is actuated to operate one of the separate feed mechanisms. Each of these shaft-parts has its outer end bearings in the downturned end of the bed B, and centrally they abut to have their bearings at their inner ends in the box $y^2$. Each of these shaft-parts is provided with a ratchet-wheel $F^2$, arranged thereon and each of these ratchet-wheels is provided with a spring pawl or pawl-detent adapted to engage with said ratchet. This pawl-detent is designated at $p^5$, and as constructed and placed allows the shaft M, to turn in a direction to move up the blocks and to prevent its movement in a return direction. Each of these shaft parts M is provided with a worm gear G', and $G^2$, and each of them upon its outer end, where passing through the end of the bed, is provided with a grooved pulley L, attached to the end of each of the shaft parts thereat.

The letter D, designates a short shaft that is arranged in the bottom of the slide-way W, at each end of the machine. Each of these shafts D, is made with bearings at its outer end in the bar $b^4$, and at its inner end in the bar $b^5$, and each of these short shafts is provided with a slow spiral or cam $a^2$.

The letter Y, designates a triangular form block having a grooved edge and rounded corners which is secured on and to the outer end of each of the short shafts D. Each of the blocks Y, has connected to its outer edge and so as to rest in the groove thereat a cord-belt $B^3$, and this cord-belt after passing over the angular block Y, is continued downwardly and under so as to be in contact with the pulley L, and therefrom this belt is extended upwardly on an incline to connect with the loop-form spring $s^5$, which at $h^2$, loops onto a hook on the side of the bed at each end of the machine. As thus made when the short shaft D, of either feed mechanism is operated to make a part of a turn it causes the triangular block Y, to also turn and draw upon the cord-belt $B^3$, passing under and in part around the pulley L, thus causing the latter and the shaft M, to turn also on which the pulley L is actuated, and this operates the feed and chuck-plate rollers of the mechanism being moved as against the recoil force of the spring $S^5$. As the shaft M, is being actuated to turn, the ratchet $F^2$, turns with it under running the detent $p^5$, which drops into the ratchet so soon as the rotation of the shaft ceases to hold the latter while the carrier is being moved to slit and plane off that one of the two blocks which is adjacent to the feed mechanism being operated. When the short shaft of each feed mechanism ceases to operate and the member upon the carrier has passed its point of engagement with the spiral cam $a^2$, then the spring $S^5$, becomes operative to draw back the triangular block Y, and the spiral cam on the shaft D, to its original position and where it is in a position to again move the block being cut when actuated by the carrier.

The letter J, designates a lug that is downwardly projected from the under surface of the carrier P, at each end thereof; it being shown at one end of a part of the carrier at Fig. 11; and this lug by its position and construction is adapted to engage with the surface of the spiral cam $a^2$, when the carrier, from which this lug is dependent, is moved along over the latter to operate it and the feed mechanism as before described, the shaft D, turning when the lug J in passing comes in contact with the cam.

The letters T, designate fingers of which there is one for each feeding mechanism and each of these fingers has a journal end that is extended downwardly through the top of the machine bed wherein to turn. Where thus downwardly projected through the machine bed each of these fingers is provided with a rigidly connected crank-arm $t^2$, that pivotally connects with a rod $R^2$, that is extended outwardly to pass through a guideway $g^4$, at each end of the machine. Each of these rods $R^2$, is connected with a spring $t^3$, with the other end of the latter connected with a lug $l^4$, that is downwardly projected from the under side of the bed. As thus constructed when the end of either of these fingers is turned inwardly and into the position shown by the dotted line $t^4$, to be so held by the end of the block indicated by the dotted line U, the finger is so held and the rod $R^2$, is drawn inwardly from the end. When the block being cut becomes thin so that the end $e^2$, of the finger is not held up close to the feed roller $A^2$, of each feed mechanism the spring $t^3$, becomes active, the finger moves outwardly on its journal bearing and the rod $R^2$, passes out through the guideway $g^4$, at each end of the machine, and the function of this rod so acted upon is to stop that one of the feed mechanisms where the block has been cut away until too thin for further shredding and this rod so actuated performs its function in the following manner:

The letter $d^4$, designates an angular plate that is attached to the angular block Y, on its inner side so as to move with it. When the carrier has acted and moved the shaft D, and cam $a^2$, by means of the lug J, and into the position shown at Fig. 4, and the block being shredded has become thin enough for the finger T, to move away from the end of the block by which it was held as inturned against the force of the spring, the rod $R^2$, is moved outwardly to engage with the under edge of the plate $d^4$, and thus hold it to prevent its being drawn back by the loop-spring $S^5$, and as held the lug J, on the bottom of the carrier when the latter is reciprocated passes over the shaft D, without engaging with its spiral cam, and no feed movement of the adjacent block being cut is accomplished.

The letter H, designates an arm that at $p^6$, is pivoted to the end of the machine there being such an arm so constructed and arranged for each feed mechanism.

The letter N, designates a set-screw that is threaded into a lug $n^5$, projected from each end of the machine, and the function of this arm H, and set-screw N is to regulate the distance at which the plate Y, on the shaft D shall turn to prevent the spring $S^5$ in drawing back the parts from carrying the block Y too far around, and to thus bring regularly into position the shaft D, and its spiral cam $a^2$. Hence when the plate Y draws back by the operation of the spring $S^5$, the measure of its movement is regulated by the arm H, and set-screw N.

As thus made and arranged two blocks of wood are each cut from in connection with a separate feed motion; and are each alternatingly cut from by the operation of a single carrier that is provided with a plane and slitting spurs at each end; with the feed-mechanism so operated by the carrier as to move up each block of wood after the plane and spurs of one end of the carrier have made a cut and returned to make another, and by which arrangement the cutting tools are not drawn back over wood and in contact with it under feed pressure to be dulled and worn thereby as is the case when the feed is immediately moved up after a cut and before the carrier draws back to commence making another.

Having thus described my invention, what I claim, and desire to secure by Letters Patent, is—

1. The combination with a feed-mechanism located at each end of the machine, and consisting of a chuck-plate constructed to be moved outwardly endwise from the machine bed against the force of a spring said chuck-plates each having a vertically placed chuck-roller and each of said feed-mechanisms having a vertically fluted feed-roller upwardly projected from the machine bed, and each of said chuck-rollers and the next adjacent one of the feed-rollers making a geared connection with a separate feed-shaft; of a carrier having a plane and slitting spurs at each end, and constructed to be reciprocated and to alternatingly operate said feed-shafts in the manner as and for the purposes set forth.

2. The combination with the reciprocating carrier P, of the lug J, arranged on its under surface at each end thereof; the shafts D, D, each made with the spiral cam $a^2$, and constructed to turn in the machine bed beneath the traverse of said carrier, and each having on its outer end where subtending the bed the grooved pulley Y; the shafts M, M, each having its bearings in the bed beneath said carrier, and each provided at its outer end where subtending the bed with the grooved pulley L; the worm-gears G' and $G^2$, arranged on each of said shafts between its end bearings; the vertically placed, and vertically fluted rollers A', and $A^2$ each making a geared connection with one of said worm-gears; the cord-belt $b^3$ connecting with said pulley Y, and the pulley L, at each end of the machine; and the spring $S^5$, thereat; substantially in the manner as and for the purposes set forth.

3. In a machine for shredding wood the combination with a bed provided with a slideway and two sets of vertically placed feeding rollers, and each set adapted to engage with a separate block of wood, of a carrier having mounted in its vertical side at each end where facing said blocks a plane and spurs, and a downwardly projected cam-pin; said carrier being arranged to be reciprocated in said slide-way, and to alternatingly cut from each of said blocks, at each full reciprocation; and a shaft for each set of feed rollers each shaft having a spiral cam in its outer end, and provided with worm-gears arranged to engage with gears on said feeding rollers, and to be alternatingly operated by the cam pin on each end of said carrier substantially in the manner as, and for the purposes set forth.

4. The combination with the chuck-roller A', and feed roller $A^2$, of the finger T, constructed to journal in the machine bed, and where beneath the latter provided with the crank-arm $t^2$, the rod $R^2$, pivotally connecting with said crank-arm and therefrom extended outwardly to pass through a guide passage in the end of the machine bed; the spring $t^3$, connected to said rod and to a lug downcast from the bed; and the plate $d^4$, arranged on the shaft D, constructed and arranged to be operated substantially in the manner as and for the purposes set forth.

5. The combination with the shaft D, having the end-plate $d^4$, and arranged to be operated substantially as described, of the rod $R^2$, having a guide passage in the end of the machine bed, and provided with a spring $t^3$, the finger T, made to journal in the machine bed, and having its lower end provided with a crank-arm $t^2$, pivoted to said rod; with the latter adapted to be drawn inwardly against the force of said spring by the engagement with the finger and the block of wood being cut, and released when this engagement ceases, to pass out through the machine bed to engage with the plate $d^4$, substantially in the manner as and for the purposes set forth.

6. In a machine for shredding wood the combination with a bed having a slide-way, and provided with a short shaft at each end of the bed and mounted therein, each of said short shafts having a spiral cam, and an angular plate at its outer end; a carrier made with a plane and slitting spurs at each end mounted in one of its sides, and at each end having a downwardly projected lug adapted to engage with each of said spiral cams; a feed-shaft at each end of the bed separately mounted therein, and each provided with two worm-gears, and having a grooved pulley at its outer end; a ratchet wheel and detent upon each of said feed-shafts; a cord belt attached to each of the angular plates and arranged to pass down under and partly around each feed-shaft pulley to connect with a spring; and two sets of feed-rollers composed of two each, with each set provided with gears on their lower ends adapted to mesh into the worm-gears of one of the feed-shafts substantially in the manner as and for the purposes set forth.

7. In a machine for shredding wood from blocks by slitting and planing off the slit portion, the combination with feeding rollers between which the blocks are held and moved to be cut from one of their sides; of a carrier having a plane and slitting spurs at each end projected from its vertical side, and constructed to be reciprocated in a slide-way in the machine bed and to alternatingly cut from each of said blocks and to operate the feed mechanism to move up the blocks; and a finger arranged to bear on one end of each of the blocks, and constructed to operate a rod to stop the feed mechanism when the blocks are cut away to the point whereat the fingers engage with them, substantially in the manner as and for the purposes set forth.

Signed at the city of Troy this 16th day of June, 1892, and in the presence of the two witnesses whose names are hereto written.

GEORGE P. JOHNSON.

Witnesses:
CHARLES S. BRINTNALL,
W. E. HAGAN.